Dec. 10, 1963  J. G. JARVIS  3,113,556
FISH FEEDER
Filed April 18, 1962
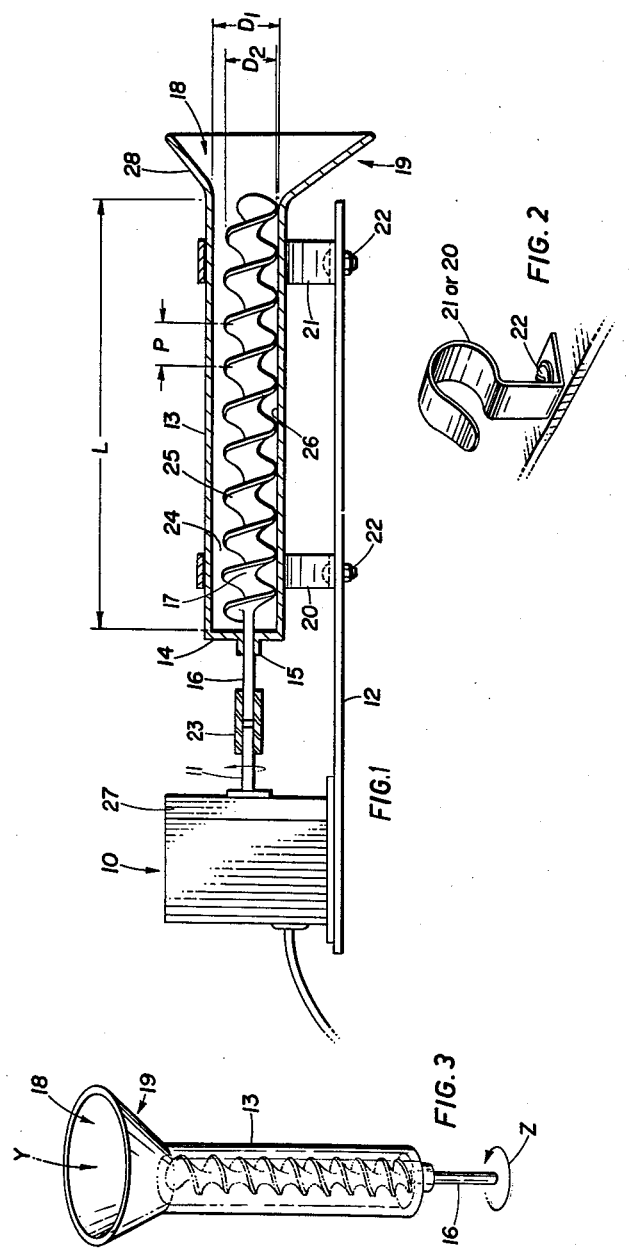
Inventor
JAMES G. JARVIS
by: Cavanagh & Norman

United States Patent Office 3,113,556
Patented Dec. 10, 1963

3,113,556
FISH FEEDER
James G. Jarvis, Cooksville, Ontario, Canada, assignor to Decor Sound Corporation, Raleigh, N.C., a corporation of North Carolina
Filed Apr. 18, 1962, Ser. No. 188,372
3 Claims. (Cl. 119—51.11)

This invention relates to an automatic fish feeder, capable of continuously feeding fish in a tank over a period of a number of months, while preserving in its functional characteristics the ability to overcome clogging of the feed during delivery and the characteristics of accomplishing a positive and continuous agitation of the feed during storage and positive delivery thereof.

Prior motorized methods for feeding fish in a tank or pool have provided for the escape by gravity of material from a perforated drum or other container or conveyor driven by the motor. Two material disadvantages attend prior methods for the automatic feeding of fish over any continued period of time. The feed may be subject to lumping or clogging, especially under conditions of high humidity adjacent the water surface of a fish tank, and particularly in the event the tank is covered, such as is usually the case in recent fish tank design. Prior methods for extracting the feed from a reservoir and delivering it to a point of delivery in the feeding mechanism, have not been positively accurate; that is, positively urged by some mechanical member or other actually to force the feed to the point of delivery, whereby a gap or stoppage can arise in the feeding mechanism.

It is the main object of this invention to overcome the aforesaid disadvantages and to provide a structure of most simple concept adapted for low-cost manufacture characterized by elementary and positive principles of operation and use.

Other objects of the invention will be apparent from a study of the following specification taken in conjunction with the accompanying drawings.

In the drawings:

FIGURE 1 is a part sectional elevation of apparatus of the invention.

FIGURE 2 is a perspective detail of one of the clamping means of the apparatus of FIGURE 1; and, FIGURE 3 is a perspective illustration on a reduced scale revealing the manner of charging the feeding apparatus of the invention with fresh feed.

Referring to the drawings, the feeder of the invention generally comprises an electric clock type motor 10 having a drive shaft 11 and mounted on a rigid base 12, the latter being adapted to be fastened in substantially a horizontal position to a fish tank. The feeding device of the invention comprises the tubular structure 13 having a closed end 14 embodying an eccentric bore and bushing portion 15 adapted slidably to accommodate shaft 16 of the feed auger device 17. The open end 18 of tube 13 is flared to provide a receiving and delivery chute portion 19. The tubular body 13 is adapted removably to be mounted in the spring clip hook shaped mountings 20 and 21 fastened such as by bolts 22 to base 12.

Shaft 16 is coupled to shaft 11 by means of a detachable flexible coupling made of an elastomer material such as rubber and provided in the form of a short length of rubber tube 23.

It has been found that as a general average about $2/1000$ of a cubic inch of fish food per gallon per day of tank water is a desirable rate of feed introduction into a fish tank. In respect of say a 10 gallon tank, this rate of feed may be provided by a ½ inch diameter by $1/10$ inch thickness volume. A thirty day volume of feed could therefore be represented by a spiral feeder of $1/10$ inch pitch 3 inches long disregarding the volume of the spiral auger therein. A 12 inch length with a spiral pitch of 10 per inch based on a rate of revolution of one revolution per day or each twenty-four hours would deliver 120 days or four months of feed assuming the diameter of the feed being delivered was of the order of ½ inch. Preferably, however, the clock motor 10 drives shaft 11 at a rate of one revolution every 96 hours whereby the helical pitch of the auger spiral may be designed at approximately ½ inch. Additionally, the diameter of the auger $D_2$ should be approximately three quarters of the diameter $D_1$ of the inner bore of tube 13 whereby the axis of shaft 16 may be located eccentric with the bore 24 to cause the edges 25 of the driving vanes of the auger to engage the lowermost surface 26 of the bore 24. In this way the feed within tube 13 is both agitated and fed continuously and any tendency for the feed to cling thus to form lumps is broken up by the action of the auger.

While retaining the same pitch P for the auger and the same ratio of diameters $D_2:D_1$ the rate of delivery of feed may be modified by changing the gear speed device 27 which may be of any suitable known construction of selectable or different ratio belt drive or gear drive device. Since the clock motor 10 will ordinarily embody an output shaft having one revolution in 24 hours, drive shaft 11 will be geared down in the ratio of 1:4 for the rate of feed above described.

At the rate of feed described the device of the invention will serve 10, 15 and 23 gallon tanks for a period up to four months. A drive ratio of 1:3 will serve 30 gallon and 36 gallon tanks for a period of three months. A drive ratio of 1:2 will serve 42 to 60 gallon tanks for a period of two months. Alternatively, a standard rate of drive may be selected for different diameters of feed device in the structure of tube 13.

In filling the feeder with feed it is removed from the coupling and clip mountings 20 and 21 and is held upright in the manner illustrated in FIGURE 3. Feed is introduced by way of arrow Y into the open end 18 in funnel portion 19 while shaft 16 is rotated in the manner indicated by arrow Z to cause the feed to be drawn into the tube 13. Preferably tube 13 is transparent or translucent so it will be apparent when same is fully charged with feed. Preferably also some portion of the tubular body 13 has a marking thereon such as an indicia 28 located on funnel 19 designating the same as top or top side whereby the auger will always be arranged to rest within the bore of the tube as illustrated in FIGURE 1 by reason of the eccentric location of the bushing 15. The feeding mechanism itself, that is the tube and auger parts, are adapted to be made of molded plastic preferably clear as described so that the parts may work loosely and thus efficiently under the conditions described while revealing the amount of feed and the condition of the feed at any time. In the feeder itself the feeding tube acts as its own reservoir or hopper for the feed charge.

What I claim is:

1. A fish feeder adapted to be mounted on a fish tank for continuous delivery of feed to the tank of a rate of predetermined volume of fish food per gallon per day of tank water and comprising in combination: a feeding auger defined by a spiral vane structure extending from an axial shaft, the contained volume between said vanes over a pitch length having regard to the diameter thereof being effectively a simple multiple of said predetermined volume, the length of said auger defining between about 60 and 120 at least of said volumes; a feed storage tube of a length generally corresponding to the length of said auger and of an inner diameter substantially greater than the diameter of said auger and of the order of about 1⅓ times the diameter of the latter; a bearing surface along substantially the full length of the lowermost surface of said inner diameter; an eccentric bearing joined to an end wall portion adapted to accommodate the shaft of said auger and defining an end wall for one end of said tube thereby locating said auger therein in a position for support of said auger on said bearing surface; means for supporting said tube to dispose the eccentric bearing thereof and said auger for a position of said engagement of said auger with said tube throughout its length under the action of gravity; and means for rotating said shaft of said auger continuously at a speed conforming to said predetermined volume per day rate.

2. A fish feeder adapted to be mounted on a fish tank for continuous delivery of feed to the tank of a rate of predetermined volume of fish food per gallon per day of tank water and comprising in combination: a feeding auger defined by a spiral vane structure extending from an axial shaft, the contained volume between said vanes over a pitch length having regard to the diameter thereof being effectively a simple multiple of said predetermined volume, the length of said auger defining between about 60 and 120 at least of said volumes; a feed storage tube of a length generally corresponding to the length of said auger and of an inner diameter substantially greater than the diameter of said auger and of the order of about 1⅓ times the diameter of the latter; a bearing surface along substantially the full length of the lowermost surface of said inner diameter; an eccentric bearing joined to an end wall portion adapted to accommodate the shaft of said auger and defining an end wall for one end of said tube thereby locating said auger therein in a position for support of said auger on said bearing surface; means for supporting said tube to dispose the eccentric bearing thereof and said auger for a position of said engagement of said auger with said tube throughout its length under the action of gravity; means for rotating said shaft of said auger continuously at a speed conforming to said predetermined volume per day rate; and a funnel-like flange defining the open end of said tube for receiving and delivering feed into and from said tube.

3. A fish feeder adapted to be mounted on a fish tank for continuous delivery of feed to the tank of a rate of predetermined volume of fish food per gallon per day of tank water and comprising in combination: a feeding auger defined by a spiral vane structure extending from an axial shaft, the contained volume between said vanes over a pitch length having regard to the diameter thereof being effectively a simple multiple of said predetermined volume, the length of said auger defining between about 60 and 120 at least of said volumes; a feed storage tube of a length generally corresponding to the length of said auger and of an inner diameter substantially greater than the diameter of said auger and of the order of about 1⅓ times the diameter of the latter; a bearing surface along substantially the full length of the lowermost surface of said inner diameter; an eccentric bearing joined to an end wall portion adapted to accommodate the shaft of said auger and defining an end wall for one end of said tube thereby locating said auger therein in a position for support of said auger on said bearing surface; means for supporting said tube to dispose the eccentric bearing thereof and said auger for a positioin of said engagement of said auger with said tube throughout its length under the action of gravity; means for rotating said shaft of said auger continuously at a speed conforming to said predetermined volume per day rate; and a removable coupling connecting said auger shaft to said drive means therefor.

References Cited in the file of this patent

UNITED STATES PATENTS

| | | |
|---|---|---|
| 742,414 | Hale | Oct. 27, 1903 |
| 2,793,791 | Clark | May 28, 1957 |